United States Patent Office 3,352,955
Patented Nov. 14, 1967

3,352,955
PROCESS OF BONDING A POLYURETHANE RESIN TO A METAL SURFACE HAVING A CURED EPOXY RESIN COATING
Kenneth A. Pigott and William Archer, Jr., New Martinsville, W. Va., assignors to Mobay Chemical Company, Pittsburgh, Pa., a corporation of Delaware
No Drawing. Filed Mar. 5, 1962, Ser. No. 177,255
1 Claim. (Cl. 264—135)

This invention relates to polyurethane metal laminates and to a method of preparing the same. More particularly, it relates to homogeneous polyurethane plastics which are tightly bonded to metal surfaces and to a method of preparing such objects in a simplified method.

It has been heretofore known that polyurethane plastics exhibit unusually good properties with respect to shock absorption, abrasion resistance, tensile strength, elongation, and other physical properties. However, it has been difficult to fabricate certain objects in the past for the reason that polyurethane plastics, and particularly elastomeric homogeneous plastics, were difficult to bond to metal surfaces and, even if a bond were achieved, it was not as strong and could not withstand the severe forces applied in certain instances to be satisfactory. Therefore, the weakest point in any given system was not the metal member or the polyurethane member, but the bond formed between the two. This necessitated mechanical connections between the polyurethane member and the metal member to insure a tight bond between the polyurethane and metal.

It, of course, has also been heretofore known that epoxy or glycidyl polyether resins possess outstanding adhesive qualities. These adhesives, however, exhibited no improved results over other known adhesives when polyurethane plastics were attempted to be bonded to metal members.

It is, therefore, an object of this invention to provide polyurethane metal laminates. It is another object of this invention to provide a method for making polyurethane metal laminates. It is still another object of this invention to provide homogeneous polyurethane plastics which are tightly bonded to metallic surfaces. It is a further object of this invention to provide a method of molding a non-porous homogeneous polyurethane plastic directly onto a metallic surface to achieve a completed article which exhibits a high degree of adhesion between the metal and the polyurethane.

The foregoing objects and others which will become apparent from the following description are accomplished in accordance with this invention, generally speaking, by providing polyurethane metal laminates by a process which comprises coating the particular metal surface to be bonded to the polyurethane plastic with an epoxy resin adhesive, heating the coated metallic member to a temperature of from about 80° C. to about 150° C. and applying to the metal member, which is still between the temperature stated, the polyurethane plastic in a molten condition. Thus, in accordance with this invention it is necessary that the metallic member is coated with an epoxy resin and is maintained at a temperature of 80° C. to 150° C. at the time the metallic member is first contacted by the molten polyurethane plastic. These two features are essential for the practice of this invention to achieve satisfactory bonds between the metal surface and the polyurethane plastics.

Any polyurethane plastic may be bonded to metallic surfaces by the process in accordance with this invention, such as, for example, those prepared by reacting an organic compound containing active hydrogen atoms which are reactive with —NCO groups with an organic polyisocyanate. In many instances, it is also desirable to incorporate into the reaction formulation a chain extending agent which is an organic compound containing active hydrogen atoms reactive with isocyanate groups and having a molecular weight generally less than about 500 where the active hydrogen atoms are selected from hydroxyl groups, amino groups and carboxyl groups. The incorporation of such chain extenders is generally desired in the fabrication of homogeneous polyurethane plastics.

Any suitable organic compound containing active hydrogen atoms which are reactive with —NCO groups may be used in the fabrication of suitable polyurethane plastics such as, for example, hydroxyl polyesters, polyester amides, polyhydric polyalkylene ethers, polyhydric polythioethers, polyacetals and the like. Any suitable hydroxyl polyester may be used such as, for example, the reaction product of a polycarboxylic acid and a polyhydric alcohol. Any suitable polycarboxylic acid may be used in the preparation of the polyesters such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid, benzene tricarboxylic acid and the like. Of course, the corresponding acid anhydrides may also be used. Any suitable polyhydric alcohol may be used in the preparation of the polyesters such as, for example, ethylene glycol, propylene glycol, butylene glycol, hexanediol, bis-(hydroxymethyl cyclohexane), 1,4-butanediol, diethylene glycol, polyethylene glycol, 2,2-dimethyl propylene glycol, xylylene glycol, trimethylol ethane, trimethylol propane, glycerine, pentaerythritol, sorbitol, and the like. It is generally preferred that the polyurethane elastomeric plastics have a substantially linear configuration and, therefore, the difunctional acids and alcohols are preferred.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, condensates of ethylene oxide, propylene oxide, butylene oxide, amylene oxide, styrene oxide, and mixtures thereof. The polyalkylene ethers prepared from tetrahydrofuran may also be used. The polyhydric polyalkylene ethers may be prepared by any known process such as, for example, the process described by Wurtz in 1859 and in the "Encyclopedia of Chemical Technology," volume 7, pages 257 to 262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulphide, 4,4'-dihydroxy butyl sulphide, 1,4-($\beta$-hydroxy ethyl) phenylene dithioether and the like.

Any suitable polyester amide may be used such as, for example, the reaction product of an amine and/or amino alcohol with a carboxylic acid. Any suitable amine such as, for example, ethylene diamine, propylene diamine, and the like may be used. Any suitable amino alcohol such as, for example, $\beta$-hydroxy ethyl amine and the like may be used. Any suitable polycarboxylic acid may be used such as, for example, those more particularly described above for the preparation of the hydroxyl polyesters. Further, a mixture of a glycol and an amino alcohol or polyamine may be used. Any of the glycols mentioned for the preparation of the polyesters may be used.

Any suitable polyacetal may be used such as, for example, the reaction product of an aldehyde and a polyhydric alcohol. Any suitable aldehyde may be used such as, for example, formaldehyde, paraldehyde, butylaldehyde and the like. Any of the polyhydric alcohols mentioned above in the preparation of the hydroxyl polyesters may be used. Any of the polyacetals set forth in U.S. Patent 2,961,428 may be used.

It is preferred in the practice of this invention that the active hydrogen containing compound have a molecular weight of at least about 400 and even more preferred from about 600 to about 4500. Best results are obtained when the molecular weight of the organic compound containing active hydrogen atoms is from about 1500 to about 3,000. It is also preferred that the hydroxyl number of this organic compound containing active hydrogen atoms be from about 190 to about 25. It is further preferred that the active hydrogen compound be substantially linear.

Any suitable organic polyisocyanate may be used in the process of this invention such as, for example, aliphatic, aromatic, alicyclic, and heterocyclic polyisocyanates including such as, for example, ethylene diisocyanate,
ethylidene diisocyanate,
propylene diisocyanate,
butylene diisocyanate,
cyclopentylene-1,3-diisocyanate,
cyclohexylene-1,4-diisocyanate,
cyclohexylene-1,2-diisocyanate,
2,4-tolylene diisocyanate,
2,6-tolylene diisocyanate,
4,4'-diphenyl methane diisocyanate,
2,2'-diphenyl propane-4,4'-diisocyanate,
3,3'-dimethyl diphenyl methane-4,4'-diisocyanate,
p-phenylene diisocyanate,
m-phenylene diisocyanate,
xylylene diisocyanate,
1,4-naphthylene diisocyanate,
1,5-naphthylene diisocyanate,
diphenyl-4,4'-diisocyanate,
azobenzene-4,4'-diisocyanate,
diphenyl sulphone-4,4'-diisocyanate,
dichlorohexamethylene diisocyanate,
tetramethylene diisocyanate,
pentamethylene diisocyanate,
hexamethylene diisocyanate,
1-chlorobenzene-2,4-diisocyanate,
furfurylidene diisocyanate,
2,7-diisocyanate-dibenzofuran,
1,3,5-benzene-triisocyanate,
2,4,6-tolylene triisocyanate,
triphenyl methane triisocyanate,
tetraphenyl methane tetraisocyanate, and the like. It is preferred, however, that diisocyanates and, particularly aromatic diisocyanates be used. Best results are obtained using diphenyl alkane diisocyanates and even more preferably, 4,4-diphenyl methane diisocyanate.

Any suitable chain extending agent having a molecular weight less than 500 and having active hydrogen atoms which are reactive with isocyanate groups may be used such as, for example, polyhydric alcohols including ethylene glycol, propylene glycol, butylene glycol, 1,4-butanediol, butenediol, butynediol, xylylene glycol, amylene glycol, 1,4-phenylene-bis-(β-hydroxy ethyl ether), 1,3-phenylene - bis-(β - hydroxy ethyl ether), bis-(hydroxy methyl-cyclohexane), hexanediol, thiodiglycol, trimethylolethane, trimethylol propane, glycerine, pentaerythritol, and the like; polyamines such as, for example, ethylene diamine, propylene diamine, butylene diamine, hexomethylene diamine, cyclohexylene diamine, phenylene diamine, tolylene diamine, xylylene diamine, 3,3'-dichlorobenzidene, 3,3' - dinitrobenzidene, 4,4'-methylene-bis (2-chloro aniline), 3,3-dichloro-4,4'-biphenyl diamine, 2,6-diamino pyridine, 4,4'-diamino diphenyl methane, and the like; alkanol amines such as, for example, ethanol amine, aminopropyl alcohol, 2,2-dimethyl propanol amine, 3-amino cyclohexyl alcohol, p-amino benzyl alcohol, and the like. The difunctional and higher functional chain extenders mentioned in U.S. Patents 2,620,-516, 2,621,166 and 2,729,618 may be used in the practice of this invention.

In accordance with this invention the polyurethane plastics may be formed by any one of a variety of techniques such as, for example, the casting method, the millable gum technique, or the recently developed green stock technique. In any of these techniques, an active hydrogen containing compound, an organic polyisocyanate and a chain extending agent as set forth above, can be intimately combined and this reaction mixture immediately cast into a suitable mold which will give the desired configuration of the final product, or the active hydrogen containing compound and the organic polyisocyanate can first be reacted to yield an —NCO terminated prepolymer which can then be further mixed with a chain extending agent and this reaction mixture then cast into a suitable mold. In both of these techniques the isocyanate is used in excess in order to provide more than a stoichiometric equivalent of the —NCO groups for the active hydrogen groups present in both the active hydrogen compound and the chain extending agent. Of course the prepolymer method or the method wherein all of the components are combined simultaneously may also be used in both the millable gum technique and the green stock technique. In the former, the organic compound containing active hydrogen atoms, the organic polyisocyanate and the chain extender may be admixed in a quantity such that the polyisocyanate is present in an amount insufficient to react with all of the active hydrogen atoms present. This mass, which forms a crumb, is then admixed on rollers similar to that used in the rubber industry with an additional amount of isocyanate to form a high viscosity gum which is suitable for both extruding and injection molding techniques.

In the green stock technique, either an —NCO terminated prepolymer prepared by reacting any one of the above-mentioned organic compound containing active hydrogen atoms and an organic polyisocyanate or the several reactive components are intimately mixed for a short period of time with a suitable chain extending agent in a ratio such that the —NCO to —OH groups are present in an amount of from about 1.04 to about 1.14. This reaction mixture is then immediately cast onto a heated tray maintained at a temperature of about 100° C. wherein it is permitted to remain until solidification occurs. The mass is then removed from the trays and permitted to cool. At this time a particle reducing step is accomplished wherein the large slabs which are formed are broken up to a size for use in injection molding or extruding machines. The material in this form is substantially storage stable and can be further fabricated at subsequent times merely by the application of heat or the application of heat and pressure. This process is more fully described in U.S. patent applications Ser. Nos. 44,242, now abandoned, 108,988, now Patent No. 3,214,411, 152,916, now abandoned, 146,413, now abandoned, and 134,580, now abandoned, the disclosures of which are incorporated by reference into this specification. This last-mentioned technique, i.e., the green stock method, is the preferred method for practicing this invention because of its ease in handling the reactive components and the final urethane polymer, prior to its fabrication into the desired final form when bonded to the metallic surface.

As stated previously, the metallic surface to which a polyurethane plastic is to be tightly bonded is first coated with an epoxy or glycidyl polyether. Any suitable resinous polymeric epoxide or glycidyl polyether may be used in the practice of this invention such as, for example, those prepared by reacting a polyhydric phenol or polyhydric alcohol with an epihalohydrin in an alkaline medium. Any suitable polyhydric phenol may be used to prepare a suitable glycidyl polyether such as, for example, resorcinol, catcheol, hydroquinone, 4,4'-dihydroxy-diphenyl dimethyl methane (commonly referred to as bis-phenol A), 4,4'-dihydroxy diphenyl methyl methane, 4,4'-dihydroxy diphenyl methane, 4,4'-dihydroxy diphenyl sulphone, glycerol, propylene glycol, 1,5-pentanediol, and the like. Of these dihydric alcohols it is preferred to use the bis-hydroxy phenyl alkanes and, even more particularly to obtain the best results, to use bis-phenol A.

Any suitable epihalohydrin may be used in reaction with the dihydric phenols to prepare glycidyl polyethers such as, for example, epichlorohydrin, epibromohydrin, and the like. It is preferred to use epichlorohydrin.

In the preparation of the polymeric epoxides, aqueous alkali is employed to combine with the halogen of the epihalohydrin reactant. The alkali is used in an amount substantially equivalent to react with the halogen present and preferably should be employed in an amount somewhat in excess thereof. Aqueous mixtures of alkali metal hydroxides such as potassium hydroxide, and lithium hydroxide may be employed although it is preferred to use sodium hydroxide because of the ecomonics involved.

While the product of this reaction is generally a complex mixture of glycidyl polyethers the principal product can be represented by the formula:

where $n$ is an integer of the series 0, 1, 2, 3, and R represents the divalent hydrocarbon radical of the dihydric phenol.

The resinous polymeric epoxide, or glycidyl polyether of a dihydric phenol suitable for use in this invention, has a 1,2-epoxy equivalency greater than 1.0. By epoxy equivalency, reference is made to the average number of 1,2-epoxy groups

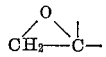

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

In other cases the epoxide equivalency is given in terms of epoxide equivalents in 100 grams of the resin, and this may vary from about 0.08 to 0.70. Also, epoxide equivalent is often expressed as the number of grams of resin containing one equivalent of epoxide.

The 1,2-epoxide value of the glycidyl polyether is determined by heating a weighted sample of the ether with an excess of 0.2 N pyridinium chloride in chloroform solution at the boiling point under reflux for two hours whereby the pyridinium chloride hydrochlorinates the epoxy groups to chlorohydrin groups. After cooling, the excess pyridinium chloride is back-titrated with 0.1 N sodium hydroxide in methanol to the phenolphthalein end point.

Resinous polymeric epoxides or glycidyl polyethers suitable for use in accordance with this invention may be prepared by admixing and reacting from one to two mol proportions of epihalohydrin, preferably epichlorohydrin, with about one mol proportion of bis-phenol A in the presence of at least a stoichiometric excess of alkali based on the amount of halogen.

To prepare the resinous polymeric epoxides, aqueous alkali, bis-phenol A and epichlorohydrin are introduced into and admixed in a reaction vessel. The aqueous alkali serves to dissolve the bis-phenol A with the formation of the alkali salts thereof. If desired, the aqueous alkali and bis-phenol A may be admixed and the epichlorohydrin added thereto, or an aqueous solution of alkali and bis-phenol A may be added to the epichlorohydrin. In any case, the mixture is heated in the vessel to a temperature within the range of about 80° C. to 110° C. for a period of time varying from about one-half hour to three hours or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

In order to cure the epoxide resins and to satisfactorily coat the metallic surfaces in accordance with this invention, it is necessary, as with all epoxide resins, to incorporate into the reaction product of the bis-phenol A and the epihalohydrin a curing catalyst. The term, "curing catalyst," as used herein means not only catalysts, per se, but also compounds generally called "hardeners" which enter into the reaction. Any suitable curing catalyst may be used such as, for example, primary, secondary, and tertiary amines such, as for example, diethylene triamine, complex amine adducts such as that formed by mixing butyl borate with isopropyl triethanolamine titanate, the adduct of diethylene triamine and allyl glycidyl ether, m-phenylene diamine, piperidine, dimethylamino propylamine, diethylamino propylamine, tris(dimethylaminomethyl)phenol, benzyl dimethylamine, pyridine, dicyandiamide, carboxylic acids and their anhydrides such as, phthalic acid, phthalic anhydrie, chlorendic anhydride, pyromellitic dianhydride, dodecenyl succinic anhydride, succinic acid, and the like.

In addition to the catalytic curing agents necessary for the epoxide reaction, certain thixotropic agents may be used in order to impart a higher viscosity to the material and to permit thicker coatings to be applied to the metallic surfaces if desired. Such thixotropic agents are not absolutely necessary for the purpose of this invention, however, for the reason that it is desirable to have thin solutions of the epoxide resin in order that it may be uniformly coated onto the metal surface and thus reduce the possibility of weak points developing in the coating. Examples of suitable thixotropic agents include bentonite-amine reaction products and estersils.

The bentonite-amine reaction products employed as thixotropic agents are composed of a montmorillonite mineral in which at least a part of the cation content of the mineral has been replaced by a cation of an organic base. Clays that contain as a primary constituent a mineral of the group known as montmorillonites are generally referred to as bentonites. Bentonites in their raw state are hydrophillic but upon reacting with organic bases or their salts become organophilic products.

More specifically, a bentonite clay of the character described and exhibiting substantial base-exchange capacity is reacted with an organic compound, more particularly one generally known as an onium compound, by substituting for the clay cation the cation of the organic compound. The reaction product may be prepared not only from a base-salt reacted with a clay-salt, but from a free base reacted with an acid clay.

Examples of organic base compounds and their salts are salts of aliphatic, cyclic, aromatic, and heterocyclic amines; primary, secondary, tertiary and polyamines; quaternary ammonium compounds, as well as other monovalent or polyvalent onium compounds.

In practicing this invention, aliphatic amine salts having from 12 to 20 carbon atoms for example, hexadecyl amine salts and octadecyl amine salts, yield excellent results. The ratio of the amine compound to bentonite may be varied within certain limits in converting the bentonite to the organophilic condition. In general, however, it is desirable to react the amine salt with the bentonite in the approximate ratio of 100 milliequivalents of amine salt to 100 grams of bentonite. Reaction products produced within this ratio give the maximum swelling as tested in nitrobenzene.

It will be understood that when a reference is made to basic organic onium compounds such as amines, it is implied that before reacting with the clay by base-exchange the amine is converted to the onium form either by the addition of acid or by reason of the fact that some part of the inorganic base in the naturally occurring clay consists of hydrogen.

The thixotropic agents may be employed in the resinous compositions in an amount of from about 1% to about 10% by weight based on the weight of the epoxide resin employed. When relatively small amounts of the thixotropic agent are employed, it aids in the application of uniform coatings on the metallic surface and prevents the resinous epoxide composition from running off the surface, thus preventing any of the area coated from becoming devoid of the resin composition while other areas would be provided with an excess thereof.

In practicing the process in accordance with this invention, the particular metal surface to which the polyurethane is to become tightly bonded is subjected to various cleaning treatments known in the art to insure the absence of foreign materials on the surface thereof. A particularly good cleaning method for the metal surface is to first sand-blast the surface to be coated and then to degrease the surface in suitable degreasing agents such as, for example, trichloroethylene, carbon tetrachloride and the like. The next step in the procedure is to apply a uniform coating of the epoxy adhesive to the metal. This can be accomplished by applying the epoxy directly or by first dissolving the epoxy polymer in a suitable solvent thereof and the catalyst for the epoxide polymer in a suitable solvent and then shortly after admixing the two solvent solutions, applying a uniform layer to the metal surface by any suitable means known in the art such as brushing, spraying, doctoring, dipping, and the like. Any suitable solvent may be used such as, for example, acetone, methylcellosolve acetate, methyl isobutyl ketone, xylol, methyl ethyl ketone, acetone, toluene, xylene, isopropanol and the like. Any metal surface to which a tightly adhering polyurethane plastic is to be bonded may be used in the practice of this invention such as, for example, steel, aluminum, tungsten carbide, cast iron, copper alloys, copper and any other suitable metallic member which forms a structural part to which a polyurethane plastic is to be bonded.

After the metallic object has been coated with the epoxy alhesive, it is placed in an oven which is maintained at a temperature such that it will bring the metallic member to a temperature of from 80° C. to 150° C. This can be accomplished for small metallic items by maintaining the oven temperature at about 110° C. and permitting the metallic member coated with the epoxy adhesive to remain therein for approximately 30 minutes. By this time, the metallic member reaches the temperature of the oven which is the preferred temperature for carrying out this invention. This heating step achieves two purposes. First, it permits the curing of the epoxy adhesive to a solidified mass tightly bonded to the metallic surface. Second, it brings the temperature of both the epoxy coating and the metallic member to the desired and essential temperature for applying the polyurethane plastic thereto. This procedure can also be carried out by a two-step method wherein the epoxy is cured first and then the coated metal member heated to the stated temperature. For example, the epoxy resin will cure at room temperature over long periods of time, however, it is still necessary to bring the metal surface to from 80° C. to 150° C. in order to achieve a tight bond. The next step in the procedure is to apply the polyurethane plastic to the hot coated metal object. This can be done, as stated previously, by any one of a number of techniques. For example, the polyurethane may be cast directly into a mold in which the coated metallic member is positioned. Further, the metallic member may be positioned in a mold which is connected to an injection molding device into which the polyurethane material is forced by the application of both heat and pressure. In this way a large number of laminated polyurethane metal objects may be prepared simultaneously by utilizing a great number of molds connected to an injection molding device by suitable passageways. As indicated previously, the epoxy resins exhibited no improved results over attempts to mold the polyurethane directly to the metallic surfaces where the temperature of the metallic member at the time of molding was not within the range of from 80° C. to 150° C. Thus, where an epoxy coated object was placed in the molding device, such as an injection molding machine, without first heating it to within this temperature, substantially no adhesion would occur between the polyurethane and the metal surface.

The invention will be further illustrated by the following examples in which parts are by weight unless otherwise specified.

*Example 1.—Preparation of a suitable glycidyl polyether*

A glycidyl polyether is prepared by introducing into a reaction vessel equipped with agitator, cooling and heating means, distillation condenser and receiver, 513 parts (2.25 mols) of bis-phenol, 2,2-bis(4-hydroxy phenyl) propane, and 208.1 parts (2.25 mols) of epichlorohydrin and 10.4 parts water. A total of 188 parts of 97.5% sodium hydroxide, corresponding to 2.04 mols (2% excess) per mol of epichlorohydrin, is added in increments over several hours. The temperature in the vessel does not rise above 100° C. and is generally not above 95° C. After all the sodium hydroxide is added, the excess water and epichlorohydrin is removed by evacuating to an absolute pressure of 50 mm. of mercury at 150° C. The vessel is then cooled to 90° C. and 36 parts of benzene added, and then cooled further to 40° C. with salt precipitating from the solution. The solution is filtered to remove the salt, the salt being washed with 36 additional parts of benzene, the benzene washing out any polyether resin and then being added to the filtrate and both returned to the vessel. The benzene is then distilled off, the polyether resin being heated at an increasing temperature until at 125° C. vacuum is applied and distillation is continued until the vessel contents are at 170° C. at 25 mm. of mercury absolute pressure. The glycidyl polyether had a viscosity of Z–3 on the Gardner-Holt scale.

*Example 2.—Preparation of a suitable polyurethane*

To a mixture consisting of about 100 parts of an hydroxy polyester having a molecular weight of about 2,000, an hydroxyl number of about 56, and an acid number of about 1.5 and prepared by reacting about 11 mols of ethylene glycol and about 10 mols of adipic acid and about 19 parts of 1,4-phenylene-bis($\beta$-hydroxyethyl) ether are added to about 40 parts of 4,4'-diphenylmethane diisocyanate. Prior to the intermixing of these three components, each is separately heated to a temperature of about 100° C. Upon the addition of the isocyanate to the polyester chain extender mixture, mechanical mixing is conducted for a period of about one minute to insure the intimate contact of the ingredients. This reaction mixture is then immediately cast onto a heated table maintained at a temperature of about 100° C. When the mixture has solidified to the point where it can be readily removed, it is taken from the table and permitted to come to room temperature. This slab, which has thus formed, is then chopped into a particle size suitable for use in an injection molding device.

*Example 3.—Preparation of the metal surface to be bonded to the polyurethane*

A steel disc having a 1 inch diameter and being ¼ inch thick is first sand-blasted and then degreased in the customary manner.

*Example 4.—Preparation of adhesive coating*

About 75 parts of a solution prepared by dissolving about 50 parts of the reaction product of Example 1 in 75 parts of acetone and 75 parts of methyl cellosolve acetate is admixed with about 50 parts of a solution prepared by dissolving about 50 parts of diethylene triamine in 75 parts of methyl isobutyl ketone and 75 parts of xylol.

*Example 5*

The steel disc prepared in accordance with Example 3 is then coated with the adhesive solution of Example 4 by means of a brush. The metallic disc is then immediately inserted into an oven maintained at a temperature of 110° C. wherein it is permitted to remain for about one-half hour, at which time it is immediately placed in a mold and connected to an injection molding machine. The hopper of the injection molding machine is filled with the polyurethane particles prepared in Example 2. The cylinder of the injection molding device is maintained at about 400° C. and the material is injected into the mold containing the steel disc at a pressure of about 600 p.s.i. for about 15 seconds. The molding is then immediately removed from the mold and placed in an oven to cure at 110° C. for 16 hours. This laminated polyurethane steel disc is subjected to 55 pounds per inch without any apparent dissociation of the two members.

*Example 6*

A polyurethane plastic is prepared in the manner described in Example 2 by reacting about 100 parts of an hydroxyl polyester prepared by reacting 11 mols of 1,4-butane diol with 10 mols of adipic acid and then admixing this polyester with about 9 parts of 1,4-butane diol and about 40 parts of 4,4-diphenyl methane diisocyanate. The remainder of the procedure is exactly as described in Example 2 for the preparation of the polyurethane. This polyurethane is then injection molded into a suitable cavity containing a disc prepared in accordance with Examples 3 through 5. A tight bond of the polyurethane to the steel disc again results.

*Example 7*

A polyurethane plastic utilizing the process described in Example 2 is made except that 27.8 parts of tolylene diisocyanate is used in place of the 40 parts of 4,4'-diphenyl methane diisocyanate. When a steel disc is bonded to this polyurethane in the manner described above, again a very tight bond requiring an excess of 50 pounds per inch to separate the laminate is obtained.

*Example 8*

About 100 parts of a polythioether having an hydroxyl number of about 56 and a molecular weight of about 2,000 and prepared by the polycondensation of thiodiglycol, about 40 parts of diphenyl methane diisocyanate and about 9 parts of 1,4-butane diol are heated separately to a temperature of about 100° C. The butanediol is then added to the polythioether. The diphenyl methane diisocyanate is then intimately mixed with the previously mixed components by means of a mechanical agitating device for a period of about one minute. The reaction mixture is then poured onto a heated table which is maintained at a temperature of about 110° C. until it has solidified. It is then removed from this table and reduced in particle size by means of a grinding apparatus. This material when injection molded into a cavity containing a disc prepared in the manner set forth above and containing a layer of an epoxy adhesive forms a urethane-steel laminate which also exhibits outstanding adhesive properties and does not peel or separate from the steel disc even when great forces are applied thereto.

*Example 9*

A polyurethane is prepared in the manner set forth above with the exception that about 100 parts of a polypropylene ether glycol having a molecular weight of about 2,000 and an hydroxyl number of about 56 is reacted together with about 26.6 parts of methylene bis (o-chloroaniline) with about 27.8 parts of tolylene diisocyanate. This reaction mixture is cast onto a heated table in the manner described above and reduced in particle size and again injection molded into a cavity containing a metallic disc as described above. Again outstanding bond strengths are obtained.

*Example 10*

About 500 parts of a polyester prepared from ethylene glycol and adipic acid and having an hydroxyl number of about 58 and acid value of about 1 is carefully dehydrated at about 130° C. under vacuum of about 12 ml. About 80 parts of 1,5-naphthylene diisocyanate are then added, thereby giving rise to an increase in temperature of from 5 to 8° C. After completion of this reaction about 10 parts of 1,4-butyne diol are added at 130° C. and, after a short stirring time, the hot mix is immediately cast into a mold containing an aluminum disc which has been sand-blasted, degreased and coated with an epoxy adhesive as described in Example 4, above. The mold is afterheated in a drying chamber at about 100° C. whereby the mix becomes rubber-like after about one-half hour. After further heating for five to six hours, the reaction of the polyurethane is complete and the material with rubber-like elastic properties is obtained tightly bonded to the aluminum disc.

*Example 11*

About 1,000 parts of a propylene glycol-1,2 adipic acid polyester are dehydrated at 130° C. and 12 ml. pressure and are then reacted with about 160 parts of 1,5-naphthylene diisocyanate. After completion of the reaction, about 30 parts of triethylene glycol are added to the mix at 130° C. The viscosity of the reaction mixture increases rapidly and the material is worked on a double-roll mill. This material is then pressed in a compression molding device onto a steel disc coated with the adhesive composition of Example 4, the disc being maintained at a temperature of about 130° C. A tenacious bond between the polyurethane and the steel disc results.

It is, of course, to be understood that any of the polyurethane plastics set forth above may be used throughout the working examples for those specific compositions utilized therein. Further, any suitable resinous epoxy adhesive may be used in place of the particular ones set forth in the working examples. It is also to be understood that any type of metallic member which forms a tight bond with the epoxy adhesive may be used.

Although the invention has been described in considerable detail in the foregoing for the purpose of illustration, it is to be understood that variations can be made by those skilled in the art without departing from the spirit of the invention and the scope of the claims.

What is claimed is:

A method of tightly bonding a polyurethane plastic to a metal surface which comprises coating a metal member with a glycidyl polyether of a dihydric phenol having a 1,2-epoxy equivalency greater than 1, heating said coated metal member until a temperature of from about 80° C. to about 150° C. is reached and said glycidyl polyether is solidified and substantially cured, placing said heated coated metal member into a cavity of an injection molding device and injecting into said cavity and in contact with said heated coated member under heat and pressure a polyurethane plastic, said polyurethane plastic being the reaction product of an organic compound containing active hydrogen atoms which are reactive with —NCO groups, an organic polyisocyanate and a chain extending agent having a molecular weight less than 500 and containing active hydrogen atoms selected from the group consisting of amino groups, hydroxyl groups and carboxyl groups.

References Cited

UNITED STATES PATENTS

| | | | |
|---|---|---|---|
| 2,801,199 | 7/1957 | Meyers | 264—266 |
| 2,829,984 | 4/1958 | Yeager | 117—161 |
| 2,874,389 | 2/1959 | Koenigsburg. | |
| 2,923,035 | 2/1960 | Schwartz | 264—328 |
| 2,990,379 | 6/1961 | Young. | |
| 3,042,545 | 7/1962 | Kienle | 117—161 |
| 3,057,746 | 10/1962 | Edmonds | 117—132 |

OTHER REFERENCES

Modern Plastics Encyclopedia for 1959 "Foamed Polyurethanes," p. 333f.

Samsone: "Urethane Coatings published in Materials in Design Engineering, June 1959, pp. 80, 81, 82 and 83.

EARL M. BERGERT, *Primary Examiner.*

JACOB H. STEINBERG, *Examiner.*

R. J. ROCHE, *Assistant Examiner.*